United States Patent [19]
Nakajima

[11] Patent Number: 5,659,747
[45] Date of Patent: Aug. 19, 1997

[54] MULTIPLE LEVEL UNDO/REDO MECHANISM

[75] Inventor: Satoshi Nakajima, Bellevue, Wash.

[73] Assignee: Microsoft Corporation, Redmond, Wash.

[21] Appl. No.: 52,036

[22] Filed: Apr. 22, 1993

[51] Int. Cl.$^6$ .............................. G06F 3/033; G06F 9/44
[52] U.S. Cl. .............................. 395/651; 395/682
[58] Field of Search .............................. 395/600, 650, 395/700

[56] References Cited

U.S. PATENT DOCUMENTS

| | | | |
|---|---|---|---|
| 4,905,181 | 2/1990 | Gregory | 395/700 |
| 5,095,421 | 3/1992 | Freund | 395/650 |
| 5,287,501 | 2/1994 | Lomet | 395/600 |
| 5,481,710 | 1/1996 | Keane et al. | 395/700 |
| 5,519,862 | 5/1996 | Schaeffer et al. | 395/651 |
| 5,530,864 | 6/1996 | Matheny et al. | 395/651 |

OTHER PUBLICATIONS

Rosenberg, Jerry M., Dictionary of Computers, Information Processing and Telecommunications, 2nd Ed., 1987, p. 434.
"Reference Manual SlickEdit"; Microedge Inc. (1992); pp. 1-4, 38 and 39, 438, 499-501.

Jeffrey Scott Vitter, "US&R: A New Framework for Redoing," *IEEE*, vol. 1(4): pp. 39-52, Oct., 1984.

Wang et al., "An Event-Object Recovery Model For Object-Oriented User Interfaces," *4th Annual Symposium On User Interface Software and Technology*: pp. 107-115, Nov., 1991.

*Primary Examiner*—Kevin A. Kriess
*Assistant Examiner*—John I. Chavis
*Attorney, Agent, or Firm*—Seed and Berry LLP

[57] ABSTRACT

A multiple-level undo/redo mechanism is provided in an operating system and is available to application programs run on the operating system. The operating system provides a mechanism for keeping a log of user commands and providing a cursor to a position within the log. Each command may be encapsulated into an object that supports an interface for performing undo/redo operations. Similarly, the log may be encapsulated into an object that supports operations that facilitate a multiple-level undo/redo. A user may perform a single undo/redo operation, multiple successive undo/redo operations or complete undo/redo operations.

8 Claims, 6 Drawing Sheets

MULTIPLE LEVEL UNDO/REDO MECHANISM

TECHNICAL FIELD

The present invention relates generally to data processing systems and, more particularly, to a mechanism for providing a multiple level undo/redo capability in operating systems and application programs.

BACKGROUND OF THE INVENTION

A single-level undo mechanism is provided by software packages, such as the Microsoft Word, version 5.0, word processing package, which is sold by Microsoft Corporation of Redmond, Washington. The single level undo mechanism allows a user command to be undone (i.e., the effects of the command are reversed) after the command has already been performed. The undo command is typically performed by selecting a menu item that lists the undo command as an option. The user is limited to a single level of undoing of commands and, thus, can only reverse the most recently executed command.

SUMMARY OF THE INVENTION

In accordance with a first aspect of the present invention, a method is practiced in a data processing system having memory means and at least one processor that is responsive to user commands. In this method, a log of user commands that were executed by the processor is stored in the memory means. A first user command stored in a log is undone so as to reverse the effect of the first user command. Subsequently, a next user command stored in the log is undone so as to reverse the effect of the next sequential user command.

In accordance with another aspect of the present invention, a log of at least two user commands is stored in the memory means. User commands stored in the log are undone so as to reverse the effects of at least two user commands. At least two of the undone user commands are then redone so as to again execute those commands.

In accordance with a further aspect of the present invention, a list of a plurality of user commands is stored in the memory means in a sequence ranging from a selected user command that has been executed by a processor to a most recently executed user command. The effects of all of the user commands stored in a sequence of the list are undone so as to return the processor to reverse the effects of the user commands in the sequence.

In accordance with still another aspect of the present invention, a list of a plurality of user commands is stored in the memory means. The list includes user commands that have been undone. The user commands that have been undone are again executed by the processor.

DETAILED DESCRIPTION OF THE INVENTION

The preferred embodiment of the present invention provides a mechanism for performing multiple-level undo/redo operations in an application program. The mechanism keeps a log of user commands and maintains a current position in the log to monitor a current state of the application program. The log is used by the mechanism to facilitate multiple-level undo operations and multiple-level redo operations.

Figure 1:
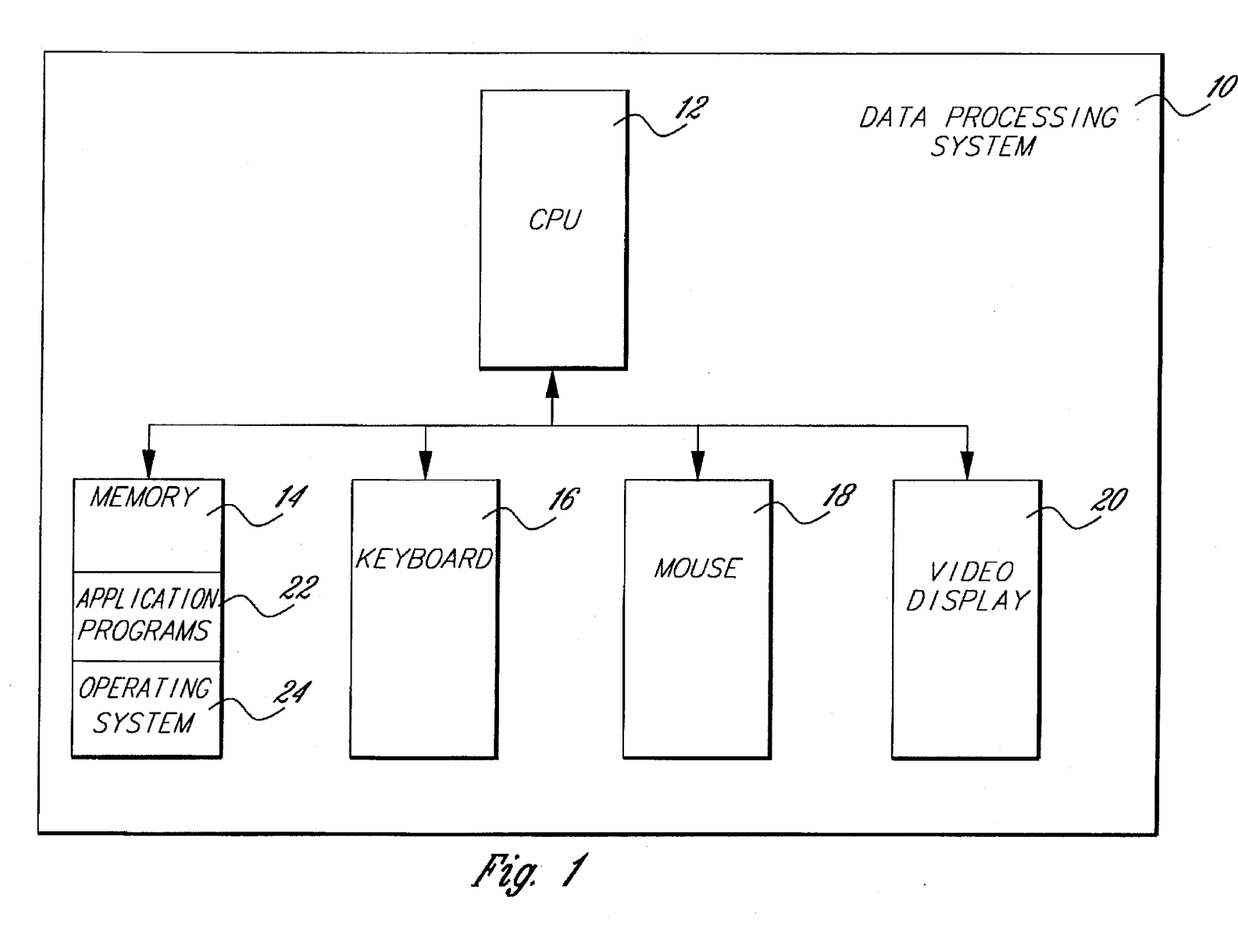
FIG. 1 is a block diagram of a data processing system for practicing a preferred embodiment of the present invention.

FIG. 1 shows a block diagram of a data processing system 10 suitable for implementing the preferred embodiment of the present invention. The data processing system 10 includes a central processing unit (CPU) 12 and a memory 14. The memory 14 holds application programs 22, an operating system 24 and other items. The data processing system 10 also includes a keyboard 16, a mouse 18 and a video display 20. The data processing system 10 shown in FIG. 1 is a conventional single processor system. Nevertheless, it should be appreciated that the present invention may also be implemented in a distributed system or in other environments.

The preferred embodiment of the present invention is designed for use in an object-oriented programming environment. For purposes of the discussion below, it is assumed that the operating system 24 is an object-oriented operating system. Those skilled in the art will appreciate, however, that the present invention is not limited to use within an object-oriented operating system. Instead, it may also be implemented in other environments.

The object-oriented operating system 24 supports the use of "objects" in the data processing system 10. An object may be viewed as a combination of data members and member functions. The data members are attributes that are stored in data structures, and the member functions are functions that act upon these attributes. The notion of an object is exploited in the multiple-level undo/redo mechanism of the preferred embodiment of the present invention in that certain aspects of this mechanism are implemented as objects.

An interface is a group of semantically-related functions that are organized into a named unit. Each interface may be uniquely identified by its identifier. Interfaces have no instantiation, that is an interface definition does not include code for implementing the functions that are specified in the interface. Interfaces specify a set of signatures for functions. An object may "support" an interface. When an object supports an interface, the object provides code for the function specified by the interface. The code supplied by the object, however, must comply with the signatures specified by the interface.

The multiple-level undo/redo mechanism of the preferred embodiment of the present invention supports the ability for an application program to maintain a command log of user commands. The data held in the command log and functions for maintaining the data are encapsulated into a command log object. The command log object includes a list 30 (see FIG. 4b) of command element objects and a cursor 32. The list 30 of command element objects is a sequential list of command element objects specifying user commands. The cursor 32 specifies a current position that corresponds with the last applied (i.e., last executed) command on the list 30 of command element objects.

Figures 2, 3A, 3B, 3C:
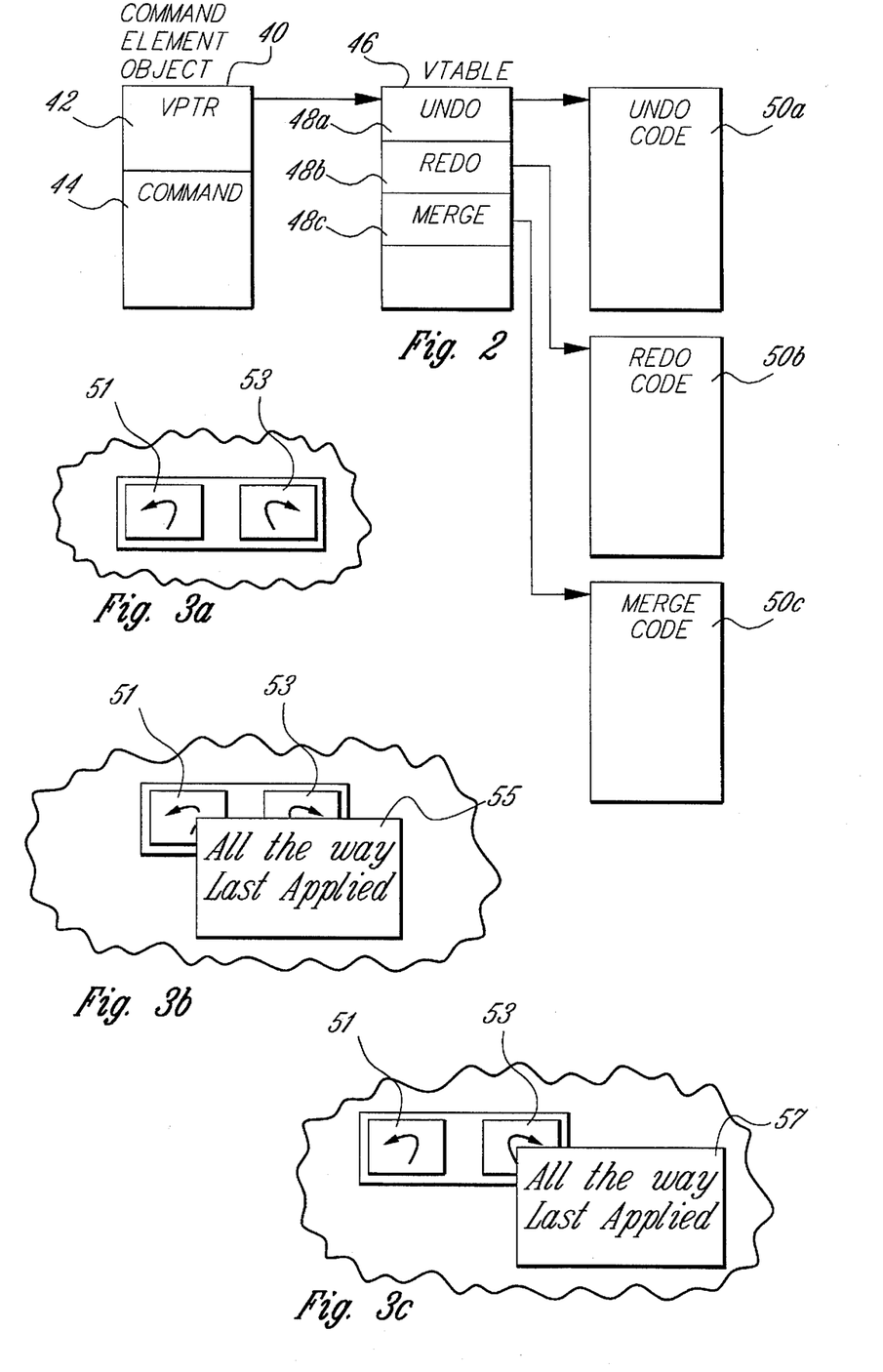
FIG. 2 is a block diagram illustrating a command element object that is used in the preferred embodiment of the present invention.
FIGS. 3a, 3b and 3c illustrate elements of a user interface for implementing the multiple-level undo/redo mechanism of the preferred embodiment of the present invention.

Each command entered by a user during the course of execution of an application program 24 generates an associated command element object 40, like that shown in FIG. 2. The command element object 40 includes a field 44 that specifies the nature of the command and a V-pointer 42. The V-pointer 42 points to a V-table 46 (i.e., having a virtual table such as found in the C++ programming language) having entries for the operations that may be performed on the command element object 40. These operations include an undo operation, a redo operation and a merge operation, for which respective entries 48a, 48b and 48c are provided. Entries 48a, 48b and 48c point to sections of code 50a, 50b and 50c for implementing their associated operations. The undo operation undoes the command at the current cursor position. The redo operation performs the next operation on the list 30 (FIG. 4b). The merge operation merges command log element objects, if possible.

The command log object does not need to know about the implementation of the code 50a, 50b and 50c for implementing operations on the command element objects 40. The details of this code 50a, 50b and 50c are the concern of the command element objects 40. As such, the command log object can be implemented more easily since it does not need to concern itself with such details.

The command log object and the command element object 40 are created by the application program 22 (FIG. 1). The operating system 24 provides a multi-level undo/redo facility to support multiple undo/redo operations for the application program. Part of this mechanism is a user interface. The user interface displays buttons 51 and 53 (FIG. 3a) that may be activated to cause execution of undo and redo commands, respectively. The undo button 51 and the redo button 53 may be activated multiple times to perform multiple undos or redos consecutively. The user is not limited to undoing only a most recent command or redoing a most recently undone command. A context menu 55 is provided for the undo button 51 when activated (see FIG. 3b). A similar context menu 57 (FIG. 3c) is provided for the redo button. The context menus 55 (FIG. 3b) and 57 (FIG. 3c) provide two options: "Last Applied" and "All The Way." These options cause either only a single last applied command to be undone/redone or the commands to be undone/redone.

The four operations provided by the multiple-level undo/redo mechanism of the preferred embodiment of the present invention are perhaps best explained by way of example. As such, examples will be provided below along with the steps performed by the preferred embodiment for each of the respective four operation types.

Figure 4A:
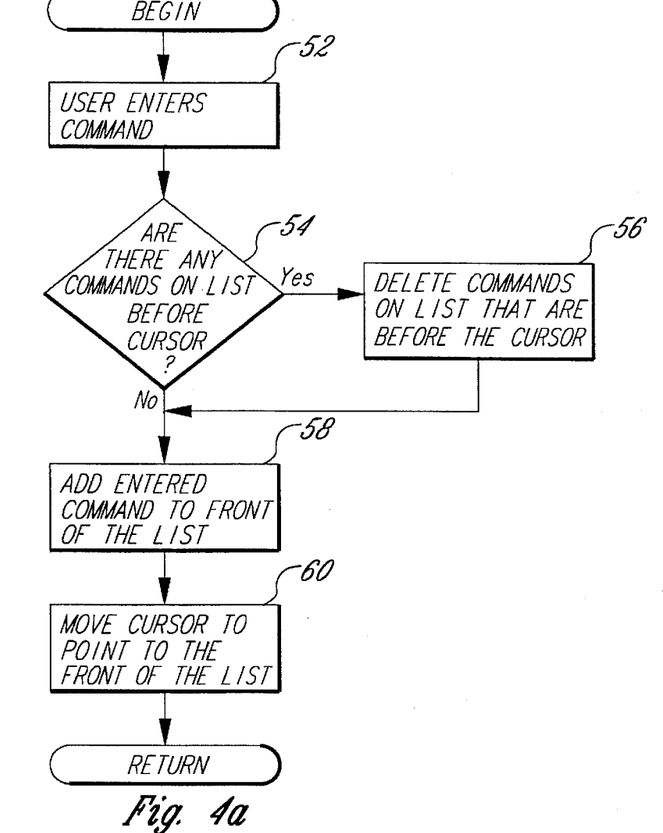
FIG. 4a is a flowchart illustrating the steps performed when a user enters a command in the preferred embodiment of the present invention.
Figure 4B:
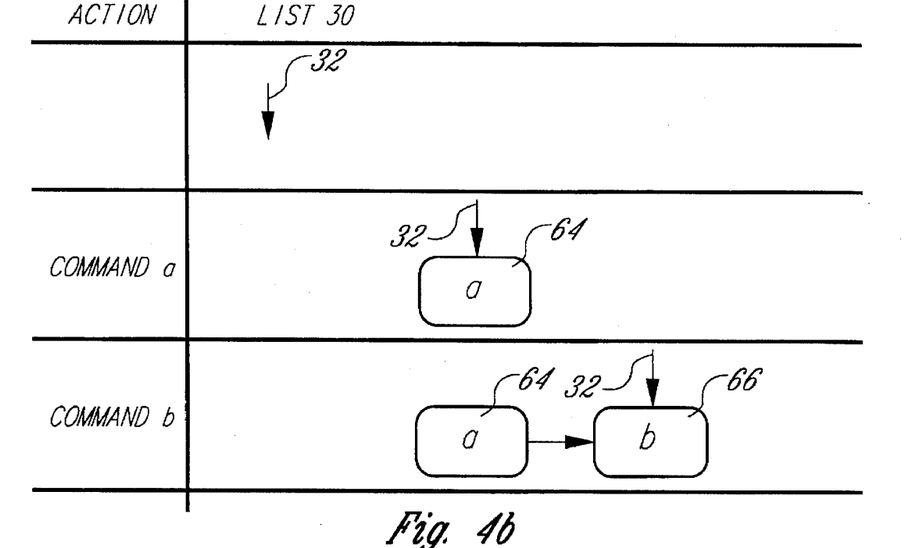
FIG. 4b is a diagram illustrating the state of the list of command element objects after commands are added in the preferred embodiment of the present invention.

FIG. 4a is a flowchart illustrating the steps performed by the preferred embodiment of the present invention when a user enters a new command. FIG. 4a will be described in conjunction with the diagram of FIG. 4b. FIG. 4b depicts an example of the list 30 of command element objects. Initially, a user enters a command (step 52 in FIG. 4a). In the example of FIG. 4b, the list 30 is initially empty. Suppose that the user then enters command "a". The multiple level undo/redo mechanism of the preferred embodiment then checks whether there are any commands on the list before the cursor 32 (step 54 in FIG. 4a). If there are no commands on the list before the cursor 32, such as in the case shown in FIG. 4b, the command is added to the front of the list 30 (step 58 in FIG. 4a), and the cursor is moved to point to the front of the list (step 60). Thus, as shown in FIG. 4b, after command "a" is entered, an entry 64 (i.e., an entry for a command element object for command "a") is added to the front of the list 30 and the cursor 32 is moved to point to entry 64. Suppose that the user now enters another command "b", (hence, repeating step 52 of FIG. 4a). Steps 54, 58 and 60 of FIG. 4a are then repeated so that an entry 66 (FIG. 4b) is added to the front of the list 30 before the entry 64 for command "a". Cursor 32 is updated to point to entry 66 for command "b".

In the above-described fashion, the list 30 of command element objects is built. In terms of the object model described above, each time a user enters a command, an instance of a command element object 40 (FIG. 2) is created; the new command element object is appended to the front of the list; and the cursor position is updated.

Figure 4C:
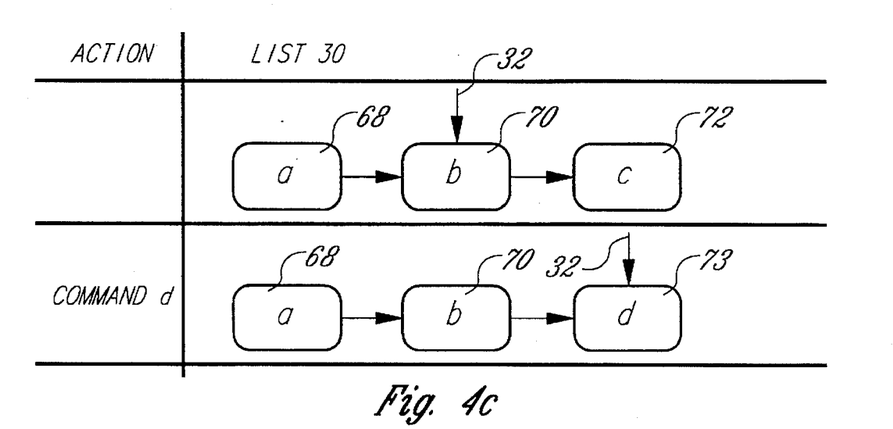
FIG. 4c diagram illustrating the list of command elements objects when a deletion of an element on the list is performed in the preferred embodiment of the present invention.

If in step 54 of FIG. 4a it is determined that there are commands on the list 30 that are situated before the cursor 32, all the commands on the list that are before the cursor are deleted (step 56 in FIG. 4a). FIG. 4c shows an example of such a deletion. Suppose that initially list 30 of command log elements includes entries 68, 70 and 72 for commands "a", "b" and "c", respectively, as shown in FIG. 4c. The cursor 32 points to entry 70 for command "b". Subsequently, a user enters command "d". In step 54 of FIG. 4a, it is determined that entry 72 for command "c" is positioned before the cursor on list 30. Hence, entry 72 is deleted in step 56 of FIG. 4a. Further, an entry 73 for command "d" is added to the front of the list 30 (see step 58 in FIG. 4a), and the cursor 32 (FIG. 4c) is updated to point to entry 73 (see step 60 in FIG. 4a).

Figure 5A:
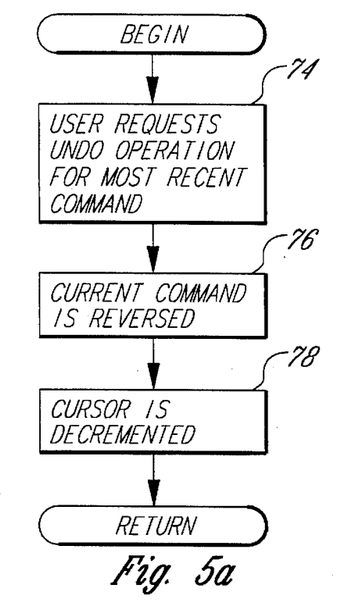
FIG. 5a is a flowchart illustrating the steps performed in an undo operation in the preferred embodiment of the present invention.
Figure 5B:
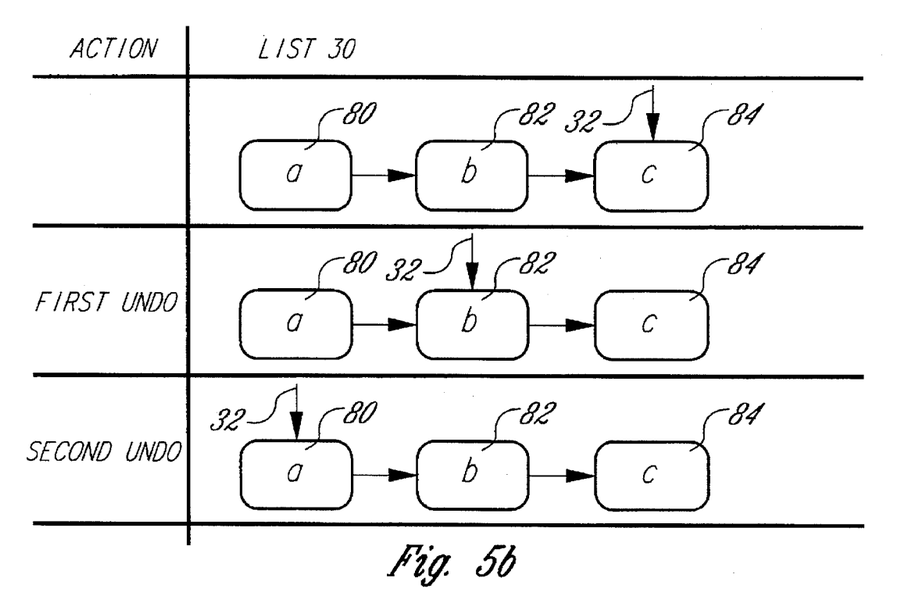
FIG. 5b is a diagram illustrating a list of command element objects when undo operations are performed in the preferred embodiment of the present invention.

Once a user has built a list 30 of command element objects, such as described above, the user may execute an undo command. FIG. 5a is a flowchart of the steps performed when an undo command is requested. FIG. 5b is a diagram illustrating the state of the list 30 of command element objects after multiple undo commands are performed on the list. The steps of FIG. 5a will be described in conjunction with the diagram of FIG. 5b. Initially, a user requests an undo operation by activating the undo button 51

(FIG. 3b) provided in the user interface. As was described above, a context menu 55 is displayed after the button 51 is activated and the context menu provides the user with the option of undoing only the most recent command (i.e., the "Last Applied" option). Suppose that the user selects the "Last Applied" option on the context menu 55 (step 74 in FIG. 5a). The command pointed to by the cursor 32 is undone by executing code 50a (FIG. 2) that is provided in the command element object (step 76) for undoing the command. In addition, the cursor 32 is decremented to point to the next successive entry on the list 30 of command element objects. To perform multiple-level undo operations, the user activates the undo button 51 multiple times to repeat the above-described steps.

FIG. 5b shows an example of successive undo operations. Suppose that initially a list of command element objects includes entries 80, 82 and 84 for commands "a", "b" and "c", respectively. Further suppose that cursor 32 points to entry 84. When a user subsequently requests an undo operation, command "c" is undone and the cursor 32 is moved to point to entry 82 for command "b". If the user makes an additional undo operation request, command "b" is also undone, and the cursor is moved to point to entry 80 for command "a".

Figure 6A:
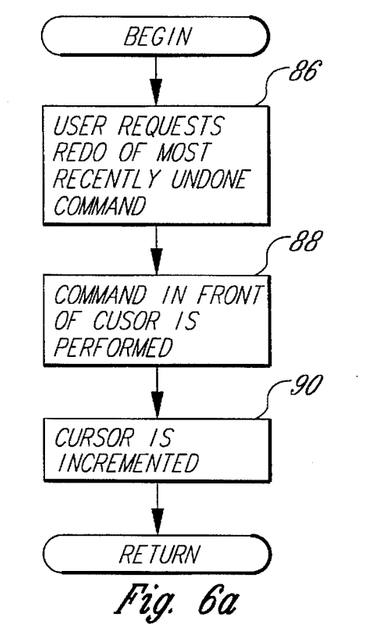
FIG. 6a is a flowchart illustrating the steps performed when a redo operation is performed in the preferred embodiment of the present invention.

A user may also request a single redo operation. FIG. 6a is a flowchart of the steps performed for a single redo operation of a most recently undone command. The process begins with a user requesting a redo operation of the most recently undone command. The user activates the redo button 53 (FIG. 3c) from the user interface and then chooses the "Last Applied" option from the context menu 57 (step 86 in FIG. 6a). The command immediately in front of the current cursor position on list 30 is then performed (step 88), and the cursor is incremented (step 90). In terms of the object model discussed above with reference to FIG. 2, the redo code 50b is executed on the command element object 40 that was most recently undone. To perform multiple-level redo operations, the user activates the redo button 53 multiple times to repeat the steps of FIG. 6a.

Figure 6B:
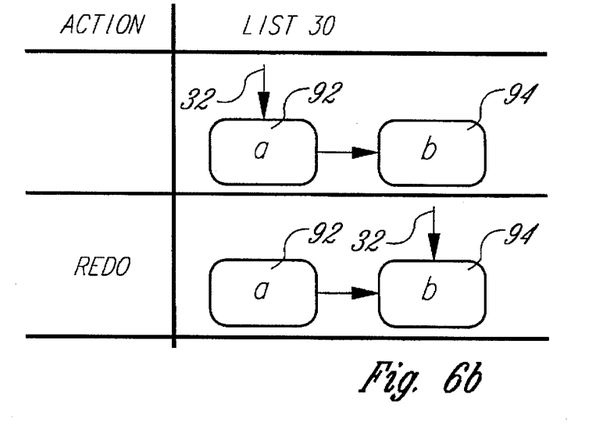
FIG. 6b is a diagram illustrating the list of command element objects when a redo operation is performed in the preferred embodiment of the present invention.

FIG. 6b shows an example of the effect of a redo command. Initially, a list 30 includes entries 92 and 94 for commands "a" and "b", respectively. Cursor 32 points to entry 92 for command "a". When the user enters a redo command, command "b" is again performed and the cursor 32 is incremented to point to entry 94 for command "b".

Figure 7A:
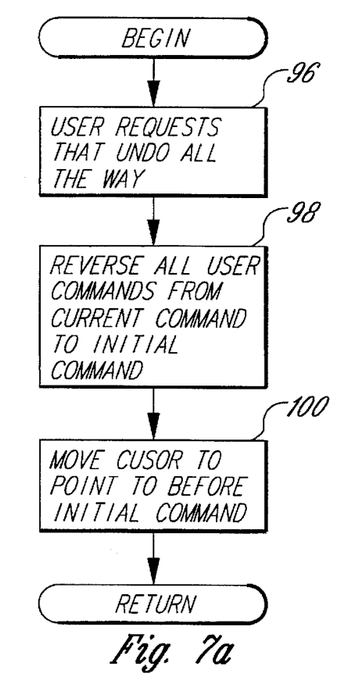
FIG. 7a is a flowchart illustrating the steps performed when an undo "All the Way" operation is performed in the preferred embodiment of the present invention.

The user has the additional option of undoing all commands on the list 30 of command element objects. FIG. 7a is a flowchart of the steps performed for a undo "All the Way" operation. Initially, a user requests that an undo "All the Way" operation be performed (Step 96 in FIG. 7a). The user requests such a command by activating the undo button 51 (FIG. 3b) and then selecting the "All the Way" option on the context menu 55. All user commands from the current command to the initial command are reversed (step 98 in FIG. 7a). In addition, the cursor is moved to point to before the initial command on list 30 (step 100).

Figure 7B:
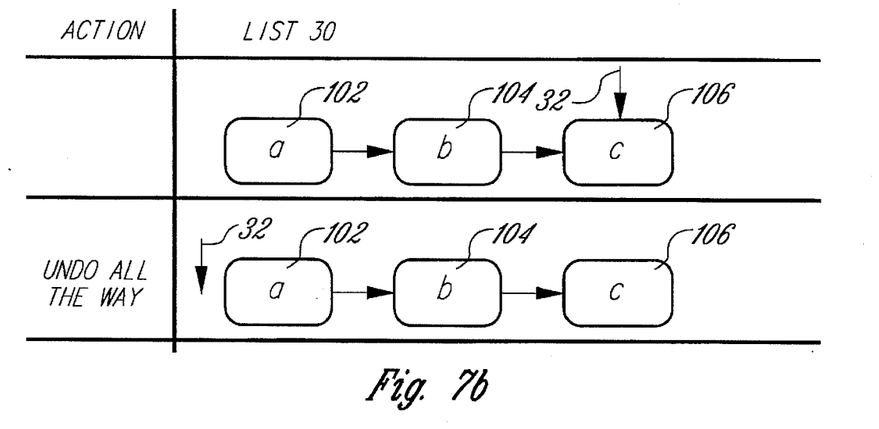
FIG. 7b is a diagram illustrating the list of command element objects when an undo "All the Way" operation is performed in the preferred embodiment of the present invention.

FIG. 7b shows an example of the effect of an undo "All the Way" operation. Initially, a list 30 of command element objects 30 includes entries 102, 104 and 106 for commands "a", "b" and "c", respectively. The cursor 32 points to entry 106 for command "c". After the user has requested the undo "All the Way" operation, commands "c", "b" and "a" are sequentially undone, and the cursor 32 is decremented to point to before the first entry on the list 30.

Figure 8A:
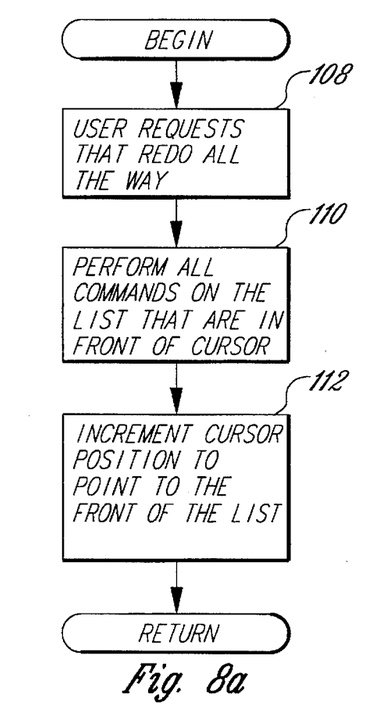
FIG. 8a is a flowchart illustrating the steps performed when a redo "All the Way" operation is performed in the preferred embodiment of the present invention.

A user may, likewise, request that the redo operation be performed "All the Way" to redo all of the commands on the list that are situated in front of the current cursor position. FIG. 8a is a flowchart of the steps performed for such an operation. Initially, the user requests that the redo "All the Way" operation be performed (step 108 in FIG. 8a). As with the other operations, the user selects the operation through the user interface. In particular, the user activates the redo button 53 and then selects the "All the Way" option from the context menu 57 (FIG. 3c). After the selection has been made, the commands that are positioned in front of the cursor 32 on the list are performed (step 110 in FIG. 8a). In addition, the cursor position is incremented to point to the front of the list (step 112).

Figure 8B:
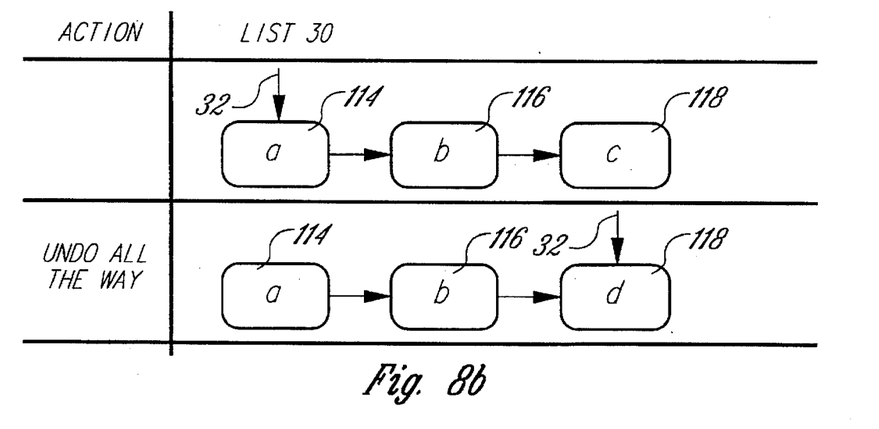
FIG. 8b is a diagram illustrating the list of command element objects when a redo "All the Way" operation is performed in the preferred embodiment of the present invention.

FIG. 8b shows an example that illustrates the effect of the redo "All the Way" operation. Initially, a list 30 of command element objects includes entries 114, 116 and 118 for commands "a", "b" and "c", respectively. The cursor 32 points to entry 114 for command "a." After the redo "All the Way" operation is performed, commands "b" and "c" have been sequentially executed, and the cursor position is incremented to point to entry 118 for command "c".

While the present invention has been described with reference to a preferred embodiment thereof, those skilled in the art will, nevertheless, appreciate that various changes in form and detail may be made without departing from the present invention as defined by the appended claims.

I claim:

1. In a computer system having a video display and running an operating system and an application program, a method comprising the computer-implemented steps of:

providing a multiple level undo/redo facility in the operating system;

creating a command element object by the application program for each associated command that is executed in the application program, each command element object including a pointer to a V-table that has at least one entry that holds a pointer to code for undoing or performing the command associated with the command element object;

linking the command element objects together in a sequential list ordered according to when the associated commands were executed;

encapsulating the sequential list of linked command element objects in a command log object that is provided by the application program;

with the undo/redo facility, displaying an activatable undo/redo user interface element in a window on the video display, wherein the window is provided by the application program; and in response to a user activating the undo/redo facility, with the undo/redo facility calling the code that is pointed to by an entry in a V-table that is pointed to by a pointer in a selected one of command element objects in the sequential list to undo or redo the command associated with the selected command element.

2. The method of claim 1 wherein the undo/redo user interface element is an undo user interface element and the entry in the V-table pointed to by the pointer in the selected command element object holds a pointer to code for undoing the command that is associated with the selected command element object.

3. The method of claim 1 wherein the undo/redo user interface element is a redo user interface element and the entry in the V-table pointed to by the pointer in the selected command element object holds a pointer to code for performing the command that is associated with the selected command element object.

4. In a computer system that has a video display and that runs an operating system and an application program, wherein the application program provides a command element object for each associated command that is executed in the application program and each command element object including a pointer to a V-table that has at least one entry that holds a pointer for undoing or redoing the command associated with the command element object and wherein the application program encapsulates a sequential list of the command element objects that are linked and ordered according to when the associated command were executed in a command log object, a computer-readable storage medium holding instructions for:

providing a multiple level undo/redo facility in the operating system;

with the undo/redo facility, displaying an activatable undo/redo user interface element in a window on the video display, wherein the window is provided by the application program; and in response to a user activating the undo/redo user interface element, with the undo/redo facility calling the code that is pointed to by the entry in the V-table pointed to by a pointer in a selected one of command element objects in the sequential list to undo or redo the associated command.

5. In a computer system having a video display and running both an operating system and an application program, a method comprising the steps of:

providing a multiple level undo/redo facility in the operating system;

displaying an activatable undo-all user interface element by the undo/redo facility in a window provided by the application program or the video display;

where a user has caused multiple commands of the application program to be executed undoing effects of executing the commands, in response to the user activating the undo-all user interface element, by the undo/redo facility calling code in the application program for undoing the commands.

6. In a computer system having a video display and running both an operating system and an application program, a computer-readable storage medium holding instructions for performing a method comprising the steps of:

providing a multiple level undo/redo facility in the operating system;

displaying an activatable undo-all user interface element by the undo/redo facility in a window provided by the application program on the video display;

where a user has caused multiple commands of the application program to be executed, undoing effects of executing the commands in response to the uses activating the undo-all user interface element, by the undo/redo facility calling code in the application program for undoing the commands.

7. In a computer system having a video display and running both an operating system and an application program, a method comprising the steps of:

providing a multiple level undo/redo facility in the operating system;

with the undo/redo facility, displaying an activatable redo-all user interface for causing all commands of the application program, that have been undone to be again executed, in a window provided by the application program on the video display; and where a user has undone multiple commands, executing the undone commands in response to the user activating the redo-all user interface element, by the undo/redo facility calling code for performing the commands in the application program.

8. In a computer system having a video display and running both an operating system and an application program, a computer-readable storage medium holding instructions for performing a method comprising the steps of:

providing a multiple level undo/redo facility in the operating system;

with the undo/redo facility, displaying an activatable redo-all user interface for causing all commands of the application program, that have been undone to be again executed, in a window provided by the application program on the video display; and where a user has undone multiple commands, executing the undone commands in response to the user activating the redo-all user interface element, by the undo/redo facility calling code for performing the commands in the application program.

* * * * *